(12) United States Patent
Goenka et al.

(10) Patent No.: US 9,682,608 B2
(45) Date of Patent: Jun. 20, 2017

(54) SUPPLEMENTAL HEATING AND COOLING SOURCES FOR A HEATING, VENTILATION AND AIR CONDITIONING SYSTEM

(71) Applicant: VISTEON GLOBAL TECHNOLOGIES, INC., Van Buren Township, MI (US)

(72) Inventors: Lakhi Nandlal Goenka, Ann Arbor, MI (US); Eric Keith Haupt, Livonia, MI (US); Heidi Crandall, Northville, MI (US)

(73) Assignee: HANON SYSTEMS, Daejeon-si (KR)

( * ) Notice: Subject to any disclaimer, the term of this patent is extended or adjusted under 35 U.S.C. 154(b) by 425 days.

(21) Appl. No.: 13/753,717

(22) Filed: Jan. 30, 2013

(65) Prior Publication Data
US 2014/0209269 A1    Jul. 31, 2014

(51) Int. Cl.
*B60H 1/00* (2006.01)

(52) U.S. Cl.
CPC .......... *B60H 1/00207* (2013.01); *B60H 2001/00221* (2013.01); *B60H 2001/00228* (2013.01)

(58) Field of Classification Search
USPC ........... 165/41, 42, 43, 44, 202, 203, 204
See application file for complete search history.

(56) References Cited

U.S. PATENT DOCUMENTS

| | | | | |
|---|---|---|---|---|
| 2,050,381 A | * | 8/1936 | Rogers | B60H 1/00007 137/351 |
| 2,185,033 A | * | 12/1939 | Melcher | B60H 1/3226 105/1.3 |
| 2,185,034 A | * | 12/1939 | Melcher | B60H 1/3226 62/244 |
| 2,336,089 A | * | 12/1943 | Gould | B60H 1/3204 180/68.2 |
| 2,347,141 A | * | 4/1944 | Werdehoff | B60H 1/00271 237/12.3 A |
| 2,476,295 A | * | 7/1949 | Hans | B60H 1/00371 165/203 |
| 2,664,308 A | * | 12/1953 | Appel | B62D 25/082 180/68.5 |
| 2,713,777 A | * | 7/1955 | Mansmann | F25D 19/02 293/117 |
| 2,722,106 A | * | 11/1955 | Henney | B60H 1/00207 454/140 |

(Continued)

FOREIGN PATENT DOCUMENTS

| | | |
|---|---|---|
| CN | 102734867 A | 10/2012 |
| DE | 19629114 A1 | 1/1998 |

(Continued)

*Primary Examiner* — Ljiljana Ciric (74) *Attorney, Agent, or Firm* — Shumaker, Loop & Kendrick LLP; James D. Miller (57) ABSTRACT

An HVAC system includes a primary HVAC unit and a supplemental heat exchanger. The primary HVAC unit is disposed within a passenger compartment of a motor vehicle and configured for at least one of heating and cooling a passenger compartment. The supplemental heat exchanger is spaced apart from the primary HVAC unit and also disposed within the passenger compartment of the motor vehicle. The supplemental heat exchanger is configured to supplement at least one of the heating and the cooling of the passenger compartment by the primary HVAC unit.

16 Claims, 5 Drawing Sheets

(56) References Cited

U.S. PATENT DOCUMENTS

| | | | | |
|---|---|---|---|---|
| 2,774,227 A * | 12/1956 | Schjolin | B60H 1/3204 | 454/108 |
| 2,804,756 A * | 9/1957 | Faulhaber | B60H 1/00207 | 454/137 |
| 2,922,290 A * | 1/1960 | Carraway | B60H 1/00007 | 165/271 |
| 3,218,820 A * | 11/1965 | Spatt | B60H 1/00371 | 62/239 |
| 3,218,821 A * | 11/1965 | Spatt | B60H 1/00371 | 62/239 |
| 3,278,121 A * | 10/1966 | Komenda | B60H 1/00207 | 237/12.3 A |
| 3,444,700 A * | 5/1969 | Beyer | B60H 1/00007 | 165/41 |
| 3,451,469 A * | 6/1969 | Hall | B60H 1/00207 | 165/41 |
| 3,455,595 A * | 7/1969 | Eggert, Jr. | B60H 1/0055 | 296/208 |
| 3,550,678 A * | 12/1970 | Pfouts | B64D 33/10 | 165/165 |
| 3,862,549 A * | 1/1975 | Fernandes | B60H 1/00371 | 165/42 |
| 3,896,872 A * | 7/1975 | Pabst | B60H 1/00028 | 165/42 |
| 3,906,740 A * | 9/1975 | Thomas | B60H 1/3229 | 165/41 |
| 3,977,206 A * | 8/1976 | Simmons | F28D 15/06 | 165/44 |
| 3,996,762 A * | 12/1976 | Calme | F25D 19/00 | 62/237 |
| 4,201,064 A * | 5/1980 | Krug | B60H 1/00371 | 62/239 |
| 4,258,555 A * | 3/1981 | Scharm | B60H 1/00007 | 62/244 |
| 4,494,597 A * | 1/1985 | Fukami | B60H 1/00007 | 165/41 |
| 4,732,011 A * | 3/1988 | Haiya | B60H 1/00371 | 62/244 |
| 4,945,977 A * | 8/1990 | D'Agaro | B60H 1/00207 | 165/43 |
| 5,054,378 A * | 10/1991 | Speece | B60H 1/00207 | 454/137 |
| 5,222,372 A * | 6/1993 | DeRees | B60H 1/0005 | 62/237 |
| 5,277,038 A | 1/1994 | Carr | | |
| 5,417,177 A * | 5/1995 | Taguchi | B60F 3/0053 | 165/44 |
| 5,450,894 A * | 9/1995 | Inoue | B60H 1/00285 | 165/43 |
| 5,553,662 A | 9/1996 | Longardner et al. | | |
| 6,059,016 A * | 5/2000 | Rafalovich | B60H 1/00492 | 165/10 |
| 6,068,046 A | 5/2000 | Pommier et al. | | |
| 6,120,370 A * | 9/2000 | Asou | B60H 1/00207 | 165/42 |
| 6,276,166 B1 | 8/2001 | Sarkisian et al. | | |
| 6,315,354 B1 * | 11/2001 | Tani | B60H 1/00207 | 296/208 |
| 6,491,578 B2 * | 12/2002 | Yoshinori | B60H 1/00007 | 165/203 |
| 6,497,275 B1 * | 12/2002 | Elliot | B60H 1/248 | 165/202 |
| 6,607,029 B2 * | 8/2003 | Danieau | B60H 1/00021 | 165/203 |
| 6,691,527 B2 | 2/2004 | Bureau et al. | | |
| 6,709,328 B1 * | 3/2004 | Jain | B60H 1/00371 | 454/108 |
| 6,758,265 B2 * | 7/2004 | Henry | B60H 1/00735 | 165/203 |
| 6,851,470 B2 * | 2/2005 | Laukhuf | B60H 1/00378 | 165/202 |
| 6,854,513 B2 | 2/2005 | Shirota et al. | | |
| 6,923,497 B2 * | 8/2005 | Umebayashi | B60H 1/0055 | 165/41 |
| 7,128,141 B2 * | 10/2006 | Ping | B60H 1/10 | 165/202 |
| 7,147,071 B2 | 12/2006 | Gering et al. | | |
| 7,156,156 B2 | 1/2007 | Haller et al. | | |
| 7,246,657 B2 * | 7/2007 | Oga | B60H 1/00735 | 165/203 |
| 7,318,469 B2 * | 1/2008 | Hosokawa | B60H 1/00571 | 165/41 |
| 7,380,587 B2 * | 6/2008 | Naruse | B60H 1/00028 | 165/202 |
| 7,434,608 B2 * | 10/2008 | Shindo | B60H 1/00007 | 165/121 |
| 7,455,136 B2 * | 11/2008 | Pleune | B60K 11/04 | 165/41 |
| 7,478,670 B2 | 1/2009 | Richter et al. | | |
| 7,530,386 B2 * | 5/2009 | Nagayama | B60H 1/00271 | 165/104.21 |
| 7,578,341 B2 * | 8/2009 | Ichishi | B60H 1/00742 | 165/202 |
| 7,581,582 B2 * | 9/2009 | Longdill | B60F 3/0053 | 165/41 |
| 7,581,584 B2 * | 9/2009 | Yoneno | A47C 7/744 | 165/202 |
| 7,640,967 B2 * | 1/2010 | Bradley | F01P 3/22 | 123/553 |
| 7,735,330 B2 | 6/2010 | Richter et al. | | |
| 7,828,050 B2 * | 11/2010 | Esaki | B60H 1/00285 | 165/202 |
| 7,879,122 B2 | 2/2011 | Richter et al. | | |
| 8,191,618 B2 | 6/2012 | Gering et al. | | |
| 8,196,648 B2 * | 6/2012 | Matsukawa | B60N 3/104 | 165/202 |
| 8,302,417 B2 | 11/2012 | Major et al. | | |
| 8,443,871 B2 * | 5/2013 | Hayashi | B60H 1/00271 | 165/202 |
| 8,591,299 B2 * | 11/2013 | DiGasbarro | B60H 1/00271 | 165/204 |
| 8,757,249 B2 * | 6/2014 | Bandai | B60H 1/00278 | 165/202 |
| 8,955,628 B2 * | 2/2015 | Murray | B60K 11/04 | 180/68.1 |
| 9,180,891 B2 * | 11/2015 | Van Polen | B61C 5/02 | |
| 2001/0004008 A1 * | 6/2001 | Aoki | B60H 1/00285 | 165/43 |
| 2003/0019619 A1 * | 1/2003 | Nakagawa | B60H 1/00007 | 165/202 |
| 2003/0115887 A1 * | 6/2003 | Currle | B60H 1/00457 | 62/3.3 |
| 2004/0074244 A1 * | 4/2004 | Ichishi | B60H 1/00742 | 62/186 |
| 2004/0089006 A1 * | 5/2004 | Kamiya | B60H 1/00028 | 62/244 |
| 2005/0011640 A1 * | 1/2005 | Tohda | B60H 1/00007 | 165/202 |
| 2005/0045320 A1 | 3/2005 | Richter et al. | | |
| 2005/0061498 A1 * | 3/2005 | Tohda | B60H 1/246 | 165/204 |
| 2005/0067140 A1 * | 3/2005 | Sogame | B60H 1/00407 | 165/42 |
| 2005/0087332 A1 * | 4/2005 | Umeo | B60H 1/00378 | 165/202 |
| 2005/0092005 A1 * | 5/2005 | Wunderlich | B60H 1/00207 | 62/244 |
| 2005/0116054 A1 | 6/2005 | Richter et al. | | |
| 2006/0000592 A1 * | 1/2006 | Bosquet | B60H 1/00021 | 165/202 |
| 2007/0095517 A1 * | 5/2007 | Schall | B60H 1/00028 | 165/204 |
| 2008/0230204 A1 | 9/2008 | Richter et al. | | |
| 2009/0038774 A1 * | 2/2009 | Ogiso | B60H 1/247 | 165/42 |
| 2009/0188266 A1 | 7/2009 | Hung et al. | | |
| 2009/0266094 A1 | 10/2009 | Major et al. | | |
| 2010/0006258 A1 | 1/2010 | Richter et al. | | |

(56) References Cited

U.S. PATENT DOCUMENTS

| | | |
|---|---|---|
| 2011/0016900 A1* | 1/2011 | Oriet ................ B60H 1/00335 62/241 |
| 2011/0036117 A1 | 2/2011 | Frohling et al. |
| 2011/0067421 A1 | 3/2011 | Shiraishi et al. |
| 2011/0174000 A1 | 7/2011 | Richter et al. |
| 2012/0003910 A1 | 1/2012 | Richter |
| 2012/0129439 A1* | 5/2012 | Ota ........................ B60H 1/242 454/120 |
| 2012/0138697 A1 | 6/2012 | Richter |
| 2012/0152511 A1 | 6/2012 | Chang et al. |
| 2012/0160446 A1* | 6/2012 | Creed ................ B60H 1/00207 165/41 |
| 2012/0174602 A1 | 7/2012 | Olivier et al. |
| 2012/0247747 A1* | 10/2012 | DiGasbarro ....... B60H 1/00028 165/204 |
| 2012/0261110 A1 | 10/2012 | Katoh et al. |
| 2012/0291986 A1 | 11/2012 | Richter |
| 2013/0000265 A1 | 1/2013 | Richter et al. |
| 2013/0008971 A1 | 1/2013 | Richter et al. |
| 2013/0068440 A1* | 3/2013 | Kamiyama ........ B60H 1/00849 165/202 |
| 2013/0333858 A1* | 12/2013 | Klinkhammer .... B60H 1/00028 165/42 |
| 2014/0060795 A1* | 3/2014 | Yu ...................... B60H 1/00821 165/202 |

FOREIGN PATENT DOCUMENTS

| | | |
|---|---|---|
| DE | 19814581 A1 | 10/1999 |
| DE | 10112969 A1 | 9/2002 |
| DE | 10147113 A1 | 4/2003 |
| DE | 10307641 B3 | 4/2004 |
| DE | 102004051874 B3 | 5/2006 |
| DE | 102005012557 A1 | 9/2006 |
| DE | 102006009162 A1 | 11/2006 |
| DE | 102006008218 A1 | 12/2006 |
| DE | 102006049852 A1 | 5/2007 |
| DE | 102008002408 A1 | 12/2009 |
| JP | H068726 A | 1/1994 |
| JP | 2006232264 A | 9/2006 |
| JP | 2009149127 A | 7/2009 |
| JP | 2009241773 A | 10/2009 |
| KR | 1999-0006310 A | 1/1999 |

* cited by examiner

SUPPLEMENTAL HEATING AND COOLING SOURCES FOR A HEATING, VENTILATION AND AIR CONDITIONING SYSTEM

FIELD OF THE INVENTION

The present disclosure relates to a heating, ventilation and air conditioning (HVAC) system for a motor vehicle.

BACKGROUND OF THE INVENTION

During the design of a motor vehicle, overall shape and dimensions of a vehicle body are defined. This determines a maximum amount of space available for each vehicle system and components to be installed in the motor vehicle.

HVAC systems such as air conditioning units generally require significant space for installation in the motor vehicle. It is desirable that the HVAC system geometry and position do not interfere with the vehicle's driver and passengers. For this reason, the HVAC system is often positioned in the instrument panel or front partition panel, which maximizes available foot space for the driver and front seat passenger.

Flat, modular HVAC systems have been used in order to optimally position HVAC systems within the motor vehicle. These types of HVAC systems also require significant mounting space in a longitudinal direction of the vehicle. One type of flat, modular HVAC system is described in Assignee's U.S. Pat. No. 7,735,330 to Richter et al., the entire disclosure of which is hereby incorporated herein by reference.

There is a continuing need for a system and a method for supplementing at least one of a heating and a cooling of a passenger compartment in motor vehicle, particularly in which a primary heating and cooling is provided by the flat, modular HVAC system. Desirably, the system and the method supplement the heating and the cooling provided by the flat, modular HVAC system using available vehicle sources, and permits supplemental heating and cooling in only zones of the motor vehicle that are occupied.

SUMMARY OF THE INVENTION

In concordance with the instant disclosure, a system and a method for supplementing at least one of a heating and a cooling of a passenger compartment in motor vehicle, particularly in which a primary heating and cooling is provided by the flat, modular HVAC system, and which supplements the heating and the cooling provided by the flat, modular HVAC system using available vehicle sources and permits supplemental heating and cooling in only zones of the motor vehicle that are occupied, is surprisingly discovered.

In one embodiment, an HVAC system includes a primary HVAC unit and a supplemental heat exchanger. The primary HVAC unit is disposed within a passenger compartment region of a motor vehicle. It is configured for at least one of heating and cooling a passenger compartment. The supplemental heat exchanger is spaced apart from the primary HVAC unit and also disposed within the passenger compartment region of the motor vehicle. The supplemental heat exchanger is configured to supplement at least one of the heating and the cooling of the passenger compartment by the primary HVAC unit.

In another embodiment, the supplemental heat exchanger of the HVAC system is positioned in one of an A-pillar and a B-pillar of the passenger compartment. The supplemental heat exchanger has an inlet in fluid communication with an engine coolant supply conduit through which hot coolant from an engine of the motor vehicle flows for the supplemental heating of the passenger compartment.

In a further embodiment, the supplemental heat exchanger is positioned in one of an A-pillar and a B-pillar of the passenger compartment, and has an inlet in fluid communication with a refrigerant supply conduit. Refrigerant from an air conditioning refrigeration system of the motor vehicle flows through the refrigerant supply conduit for the supplemental cooling of the passenger compartment.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

With reference to FIGS. 1-4, an HVAC system 2 according to the present disclosure is shown. The HVAC system 2 includes a primary HVAC unit 4 and at least one supplemental heat exchanger 6, 8, 10. The primary HVAC unit 4 is disposed within a region of a passenger compartment 12 of a motor vehicle 14, and is configured for at least one of heating and cooling the passenger compartment 12. In particular embodiments, the primary HVAC unit 4 is positioned lengthwise along a floor 16 of the passenger compartment 12 between a pair of front seats 18. One of ordinary skill in the art should appreciate that other types of primary HVAC units 4, including orientations and placement within the motor vehicle 14, may also be used within the scope of the present disclosure.

The at least one supplemental heat exchanger 6, 8, 10 is spaced apart from the primary HVAC unit 4 within the region of the passenger compartment 12. The at least one supplemental heat exchanger 6, 8, 10 is configured to supplement at least one of the heating and the cooling of the passenger compartment 12 by the primary HVAC unit 4. In particular examples, the at least one supplemental heat exchanger 6, 8, 10 is configured to transfer heat to or from a fluid such as engine coolant (e.g., a glycol coolant) or a refrigerant (e.g., an air conditioning refrigerant) provided to the supplemental heat exchanger 6, 8, 10 from an external source. In other examples, the at least one supplemental heat exchanger 6, 8, 10 may be configured to generate supplemental heat or cooling by other means, including electric resistive means for heating and piezoelectric means for cooling. Heat sinks may also be used. One of ordinary skill in the art may select suitable types of supplemental heat exchangers 6, 8, 10 for use with the HVAC system 2, as desired.

Figure 1A:
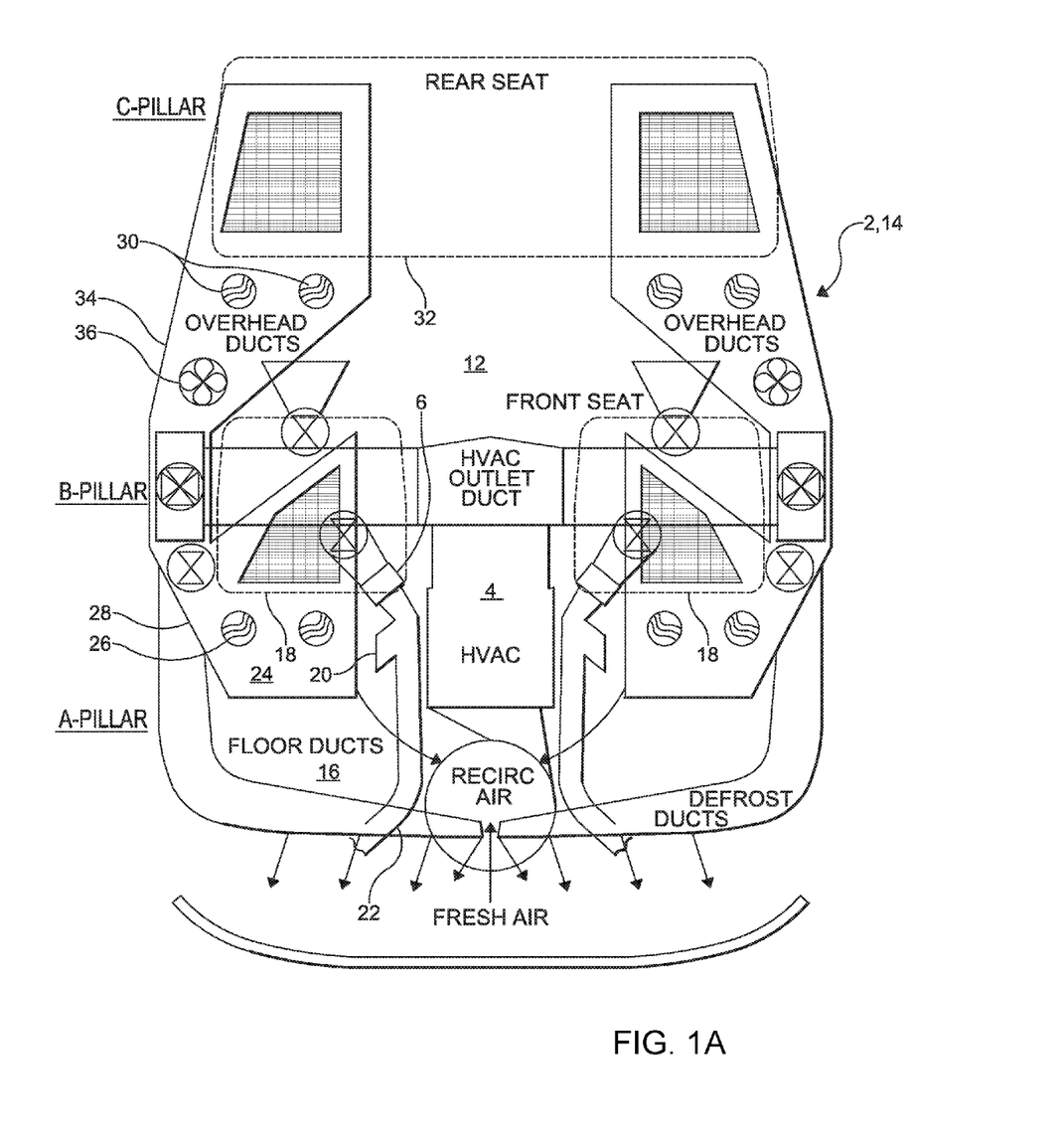
FIG. 1A is a schematic top plan view of a heating, ventilation, and cooling system for a motor vehicle, illustrating one location for a supplemental heating and cooling source.

As shown in FIG. 1A, the supplemental heat exchanger 6 may be positioned at the floor 16 of the passenger compartment 12. The supplemental heat exchanger 6 also may be positioned adjacent one of the front seats 18. The supplemental heat exchanger 6 may be fluid communication with at least one floor duct vent 20 for communication of heated or cooled air to the passenger compartment 12. The supplemental heater exchanger 6 may be in fluid communication with the at least one floor duct vent 20 via a floor duct 22 arranged at the floor 16 of the passenger compartment 12. In other embodiments, the supplemental heat exchanger 6 is disposed either adjacent, or within, the floor duct vent 20. Other arrangements of the supplemental heat exchanger 6 within the passenger compartment 12 may also be used within the scope of the disclosure.

Figure 1B:
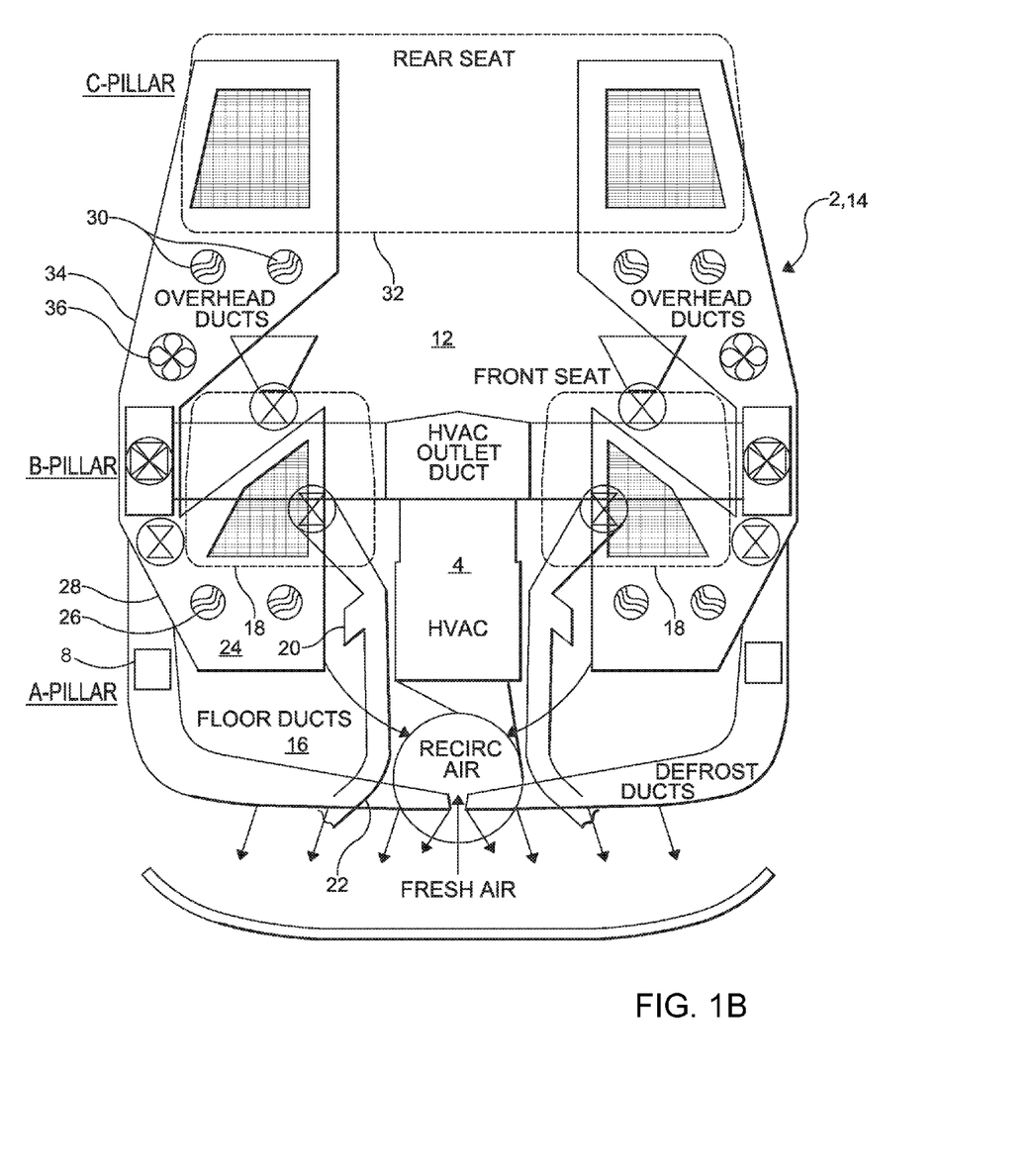
FIG. 1B is a schematic top plan view of a heating, ventilation, and cooling system for a motor vehicle, illustrating another location for a supplemental heating and cooling source.
Figure 5:
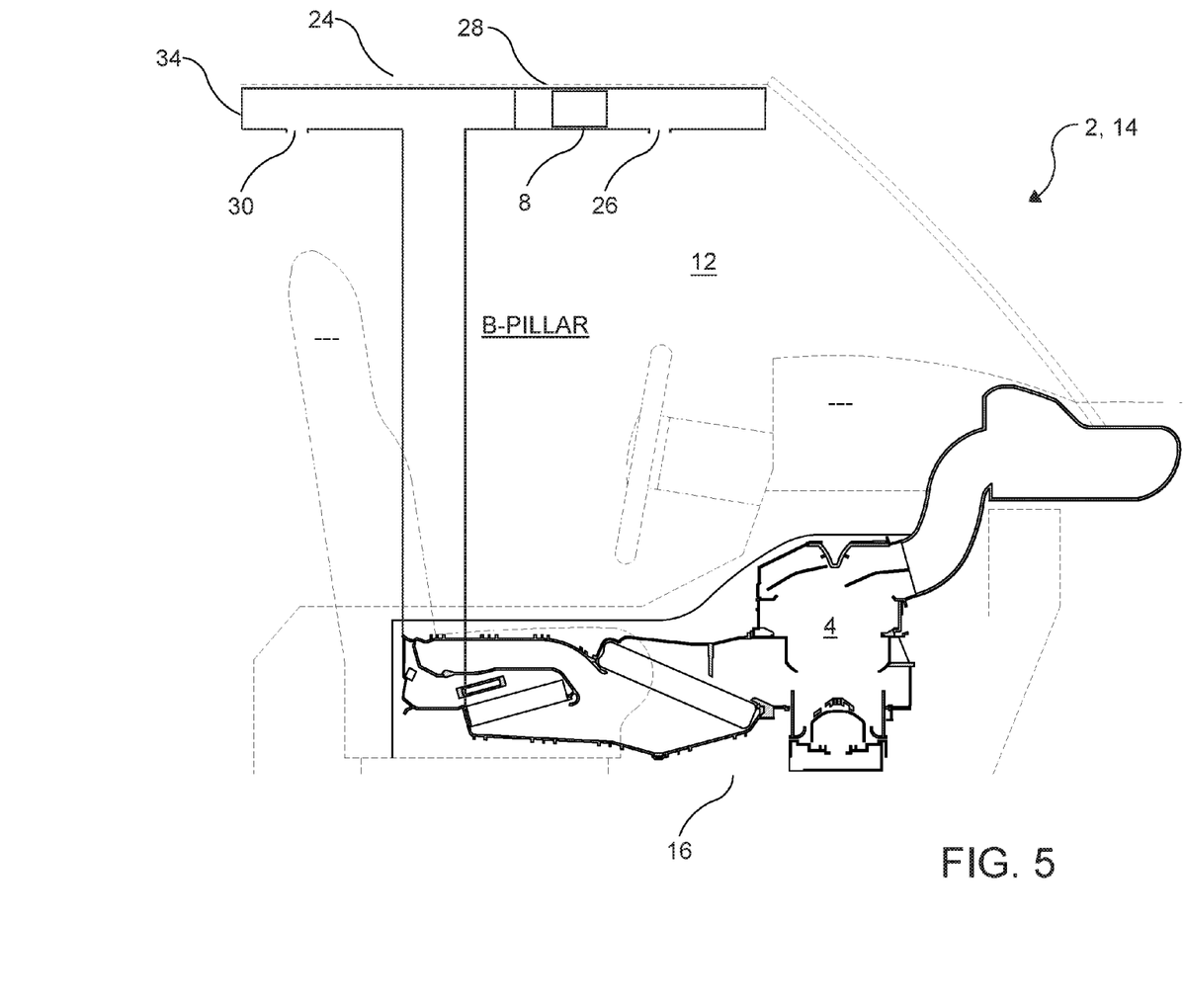
FIG. 5 is a side elevation view of the heating, ventilation, and cooling system of FIG. 1B.

In another embodiment, shown in FIGS. 1B and 5, the supplemental heat exchanger 8 may be positioned at a roof 24 of the passenger compartment 12. For example, the supplemental heat exchanger 8 may be positioned in an A-pillar of the passenger compartment 12. The supplemental heat exchanger 8 may be in fluid communication with at least one overhead duct vent 26 adjacent one of the front seats 18. The supplemental heater exchanger 8 may be in fluid communication with the overhead duct vent 26 via an overhead duct 28 arranged at the roof 22 of the passenger compartment 12. In other embodiments, the supplemental heat exchanger 8 is disposed either adjacent, or within, the overhead duct vent 28. A skilled artisan may select other arrangements of the supplemental heat exchanger 8 within the passenger compartment 12, as desired.

Figure 1C:
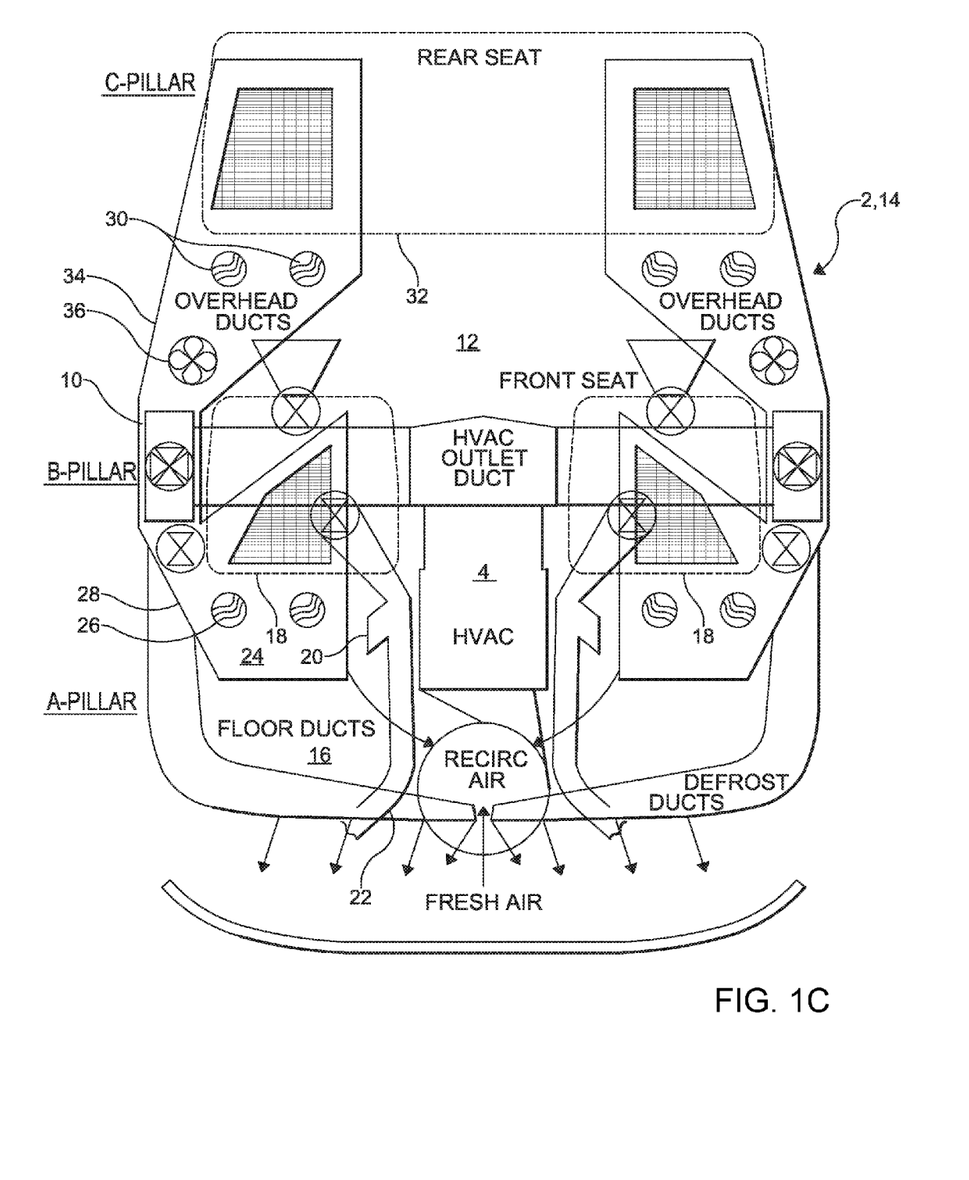
FIG. 1C is a schematic top plan view of a heating, ventilation, and cooling system for a motor vehicle, illustrating another location for a supplemental heating and cooling source.

As shown in FIG. 1C, the supplemental heat exchanger 10 may be positioned in a B-pillar at the roof 24 of the passenger compartment 12. The supplemental heat exchanger 10 may be in fluid communication with at least one overhead duct vent 30 adjacent a rear seat 32 of the passenger compartment 12. The supplemental heater exchanger 10 may be in fluid communication with the overhead duct vent 30 via an overhead duct 34 arranged at the roof 22 of the passenger compartment 12. In other embodiments, the supplemental heat exchanger 10 is disposed either adjacent, or within, the overhead duct vent 30. A skilled artisan may select other arrangements of the supplemental heat exchanger 8 within the passenger compartment 12, as desired.

Although embodiments have been described herein where the at least one supplemental heat exchanger 6, 8, 10 is located at the A-pillar and the B-pillar of the passenger compartment 12, it should be appreciated the at least one supplemental heat exchanger 6, 8, 10 may alternatively be positioned at the C-pillar, and that such positioning is also within the scope of the instant disclosure.

The HVAC system 2 may also include at least one booster fan 36. The at least one booster fan 36 may be disposed in at least one of the floor duct 22 and the overhead ducts 28, 34. For example, the at least one booster fan 36 may be a variable speed fan. The at least one booster fan 36 is configured to increase an air flow through the ducts 22, 28, 34 from the at least one supplement heater exchanger 6, 8, 10. Other types of booster fans 36 may also be employed, as desired.

Figure 2:
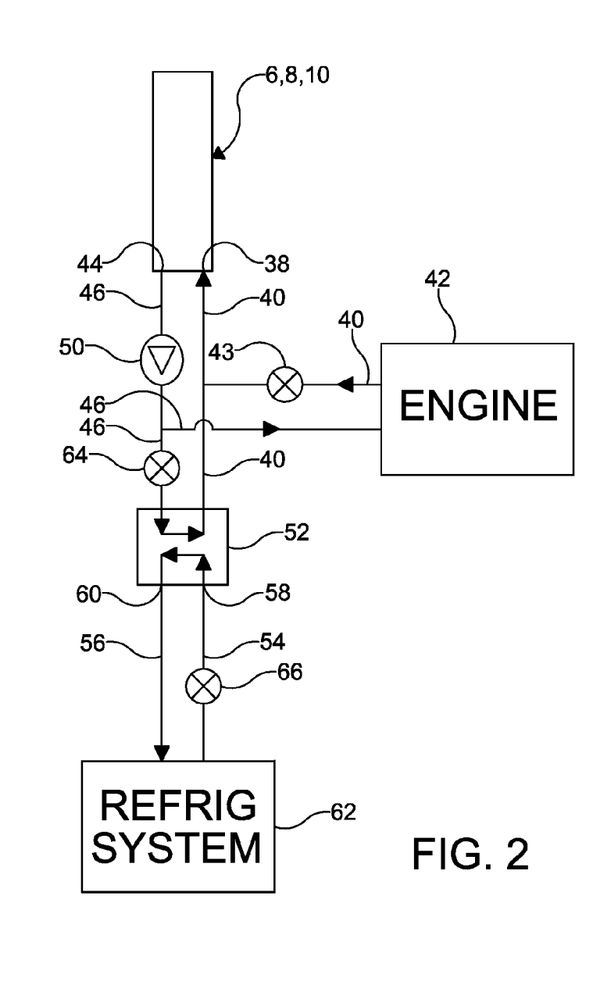
FIG. 2 is a schematic illustration of a supplemental heat exchanger according to one embodiment of the disclosure for both supplemental heating and supplemental cooling at the locations in the motor vehicle shown in FIGS. 1A-C.
Figure 4:
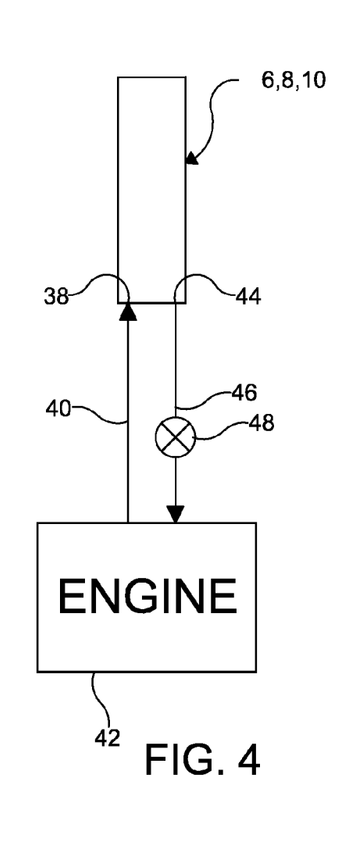
FIG. 4 is a schematic illustration of a supplemental heat exchanger according to a further embodiment of the disclosure for supplemental heating-only at the locations in the motor vehicle shown in FIGS. 1A-C.

Advantageously, the at least one supplemental heat exchanger 6, 8, 10 may employ available vehicle sources. As shown in FIGS. 2 and 4, the at least one supplemental heat exchanger 6, 8, 10 may have an inlet 38 in fluid communication with an engine coolant supply conduit 40. Hot coolant from an engine 42 of the motor vehicle may flow through the engine coolant supply conduit 40 to the at least one supplemental heat exchanger 6, 8, 10 for the supplemental heating of the passenger compartment 12.

Referring to FIG. 2, the HVAC system 2 may further include an engine coolant regulator valve 43 that is in fluid communication with the engine coolant supply conduit 40. The engine coolant regulator valve 43 is configured to control the flow of the hot coolant from the engine 42 to the supplemental heat exchanger 6, 8, 10, as desired.

The supplemental heat exchanger 6, 8, 10 also has an outlet 44 in fluid communication with an engine coolant return conduit 46 for recirculation of the engine coolant back to the engine 42 after the engine coolant flows through the supplemental heat exchanger 6, 8, 10.

As shown in FIG. 4, where the at least one heat exchanger 6, 8, 10 is in direct communication with the engine 42 and supplements by heating-only, an engine coolant regulator valve 48 may be provided in fluid communication with the engine coolant return conduit 46. The engine coolant regulator valve 48 in communication with the engine coolant return conduit 46 is configured to control the flow of the coolant from the supplemental heat exchanger 6, 8, 10 to the engine 42.

With renewed reference to FIG. 2, the HVAC system 2 may further include a pump 50. The pump 50 may be in fluid communication with the engine coolant return conduit 46, and facilitate the recirculation of the engine coolant back to the engine 42 after undergoing heat exchange with the at least one heat exchanger 6, 8, 10.

In the embodiment shown in FIG. 2, where the at least one heat exchanger 6, 8, 10 may be used for both supplemental heating and supplemental cooling, a cooling subsystem 52 may be provided. The cooling subsystem 52 may be in fluid communication with a refrigerant supply conduit 54, a refrigerant return conduit 56, and each of the engine coolant supply conduit 40 and the engine coolant return conduit 46. The cooling subsystem 52 is configured to cool the engine coolant being supplied to the supplemental heat exchanger 6, 8, 10 for the supplemental cooling of the passenger compartment 12.

In a particular embodiment, the cooling subsystem 52 is a chiller having an inlet 58 in fluid communication with the refrigerant supply conduit 54, and an outlet 60 in fluid communication with the refrigerant return conduit 56. In turn, the refrigerant supply conduit 54 and the refrigerant return conduit 56 may be in fluid communication with an air conditioning refrigeration system 62 of the motor vehicle. Other types of refrigeration systems 62 for cooling the engine coolant may also be employed, as desired.

As further depicted in FIG. 2, a control valve 64 may be provided in fluid communication with the engine coolant return conduit 46. The control valve 64 is configured to selectively direct the flow of the engine coolant from the supplemental heat exchanger 6, 8, 10 to one of the cooling subsystem 52 and the engine 42 of the motor vehicle. It should be appreciated that a selective actuation of the control valve 64 may thereby dictate whether the supplemental heat exchanger 6, 8, 10 provides supplemental heating, for example, where the control valve 64 is closed, or supplement cooling, for example, where the control valve 64 is opened. It is also contemplated that the control valve 64 may be partially opened to permit a fine temperature control of coolant being provided by the engine 42 to the at least one heat exchanger 6, 8, 10.

The HVAC system 2 may further include a refrigerant regulator valve 66. The refrigerant regular valve 66 is in fluid communication with the refrigerant supply conduit 54. The refrigerant regulator valve 66 is configured to control the flow of the refrigerant from the air conditioning refrigeration system 62 to the chiller 52. Like the control valve 64, it should be appreciated that an actuation of the refrigerant regular valve 66 may permit a fine temperature control of the coolant being provided by the engine 42 to the at least one heat exchanger 6, 8, 10.

Figure 3:
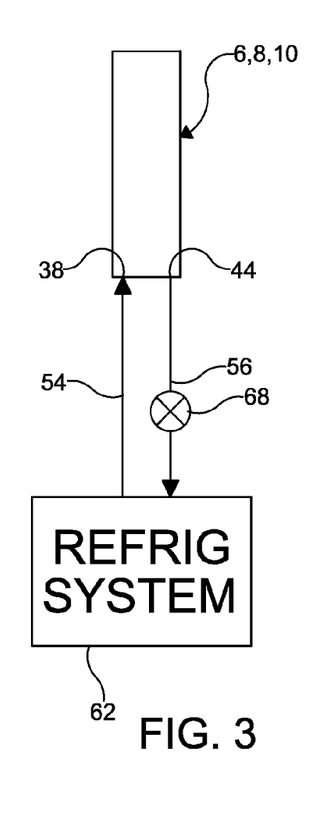
FIG. 3 is a schematic illustration of a supplemental heat exchanger according to another embodiment of the disclosure for supplemental cooling-only at the locations in the motor vehicle shown in FIGS. 1A-C.

Referring now to FIG. 3, where the at least one heat exchanger 6, 8, 10 is in direct communication with the air conditioning refrigeration system 62 and may be used for supplemental cooling-only, the inlet 38 of the at least one supplemental heat exchanger 6, 8, 10 is in fluid communication with the refrigerant supply conduit 54. Refrigerant from the air conditioning refrigeration system 62 of the motor vehicle may flow directly to the at least one supplemental heat exchanger 6, 8, 10 through the refrigerant supply conduit 54 for the supplemental cooling of the passenger compartment 12. The outlet 44 of the at least one supplemental heat exchanger 6, 8, 10 may also be in fluid communication with the refrigerant return conduit 56 through which the refrigerant is returned to the air conditioning refrigeration system 62 of the motor vehicle after flowing through the at least one supplemental heat exchanger 6, 8, 10.

A refrigerant regulator valve 68 may be provided in fluid communication with the refrigerant return conduit 56, and configured to control the flow of the refrigerant from the supplemental heat exchanger 6, 8, 10 to the air conditioning refrigeration system 62 of the motor vehicle. Other means for controlling the flow of refrigerant to and from the at least one supplemental heat exchanger 6, 8, 10 may also be used within the scope of the present disclosure.

In other embodiments, it should be understood that the HVAC system 2 may also use at least one of a positive temperature coefficient (PTC) heater and a thermal electric device (TED) as the at least one supplemental heat exchanger 6, 8, 10. As a further example, a PTC heater or a TED heater may be placed in ducts of the HVAC system 2 and be used to further augment the at least one supplemental heat exchanger 6, 8, 10 in communication with external sources of the motor vehicle, as desired. There may also be a secondary loop that routes cold coolant to the at least one supplemental heat exchanger 6, 8, 10 where a TED heater is used (via a refrigerant chiller), or hot coolant to the at least one supplemental heat exchanger 6, 8, 10.

The HVAC system 2 may further include at least one controller (not shown) which permits a selective actuation of the at least one supplemental heat exchanger 6, 8, 10 in the passenger compartment 12 of the motor vehicle, for example, by actuation of one or more of the valves associated with a supply of heat exchange fluid to the at least one supplemental heat exchanger. Likewise, the HVAC system 2 may include sensors (not shown) such as temperature sensors, pressure sensors, and the like that are in communication with the at least one controller. The selective actuation by the at least one controller may be automated in response to signals from the sensors, or in response to a manual selection of supplemental heating and cooling by an occupant of the motor vehicle, as desired.

Advantageously, the HVAC system 2 of the present disclosure efficiently heats and cools the passenger compartment 12 of the motor vehicle by permitting a supplemental heating and cooling of only occupied zones of the motor vehicle. Accordingly, the HVAC system 2 of the disclosure is efficient and permits far greater energy savings in comparison to HVAC systems previously known in the art.

While certain representative embodiments and details have been shown for purposes of illustrating the invention, it will be apparent to those skilled in the art that various changes may be made without departing from the scope of the disclosure, which is further described in the following appended claims.

What is claimed is:

1. An HVAC system for a passenger compartment of a motor vehicle, comprising:
    a primary HVAC unit disposed within the passenger compartment of the motor vehicle and configured for at least one of heating and cooling a passenger compartment;
    a supplemental heat exchanger spaced apart from the primary HVAC unit and also disposed within the passenger compartment of the motor vehicle, the supplemental heat exchanger configured to supplement at least one of the heating and the cooling of the passenger compartment by the primary HVAC unit, wherein the supplemental heat exchanger has an inlet in fluid communication with an engine coolant supply conduit through which hot coolant from an engine of the motor vehicle flows for the supplemental heating of the passenger compartment and an outlet in fluid communication with an engine coolant return conduit for recirculation of the engine coolant back to the engine after the engine coolant flows through the supplemental heat exchanger; and
    a cooling subsystem in fluid communication with a refrigerant supply conduit, a refrigerant return conduit, and each of the engine coolant supply conduit and the engine coolant return conduit, wherein the cooling subsystem is configured to cool the engine coolant being supplied to the supplemental heat exchanger for the supplemental cooling of the passenger compartment.

2. The HVAC system of claim 1, wherein the primary HVAC unit is positioned lengthwise with respect to the passenger compartment and along a floor of the passenger compartment between a pair of front seats.

3. The HVAC system of claim 2, wherein the supplemental heat exchanger is positioned at a roof of the passenger compartment.

4. The HVAC system of claim 2, wherein the supplemental heat exchanger is positioned in an A-pillar of the passenger compartment.

5. The HVAC system of claim 2, wherein the supplemental heat exchanger is positioned in a B-pillar of the passenger compartment.

6. The HVAC system of claim 1, further including an engine coolant regulator valve in fluid communication with the engine coolant supply conduit, the engine coolant regulator valve configured to control the flow of the hot coolant from the engine to the supplemental heat exchanger.

7. The HVAC system of claim 1, further including an engine coolant regulator valve in fluid communication with the engine coolant return conduit, the engine coolant regulator valve configured to control the flow of the coolant from the supplemental heat exchanger to the engine.

8. The HVAC system of claim 1, further including a pump in fluid communication with the engine coolant return conduit for causing the recirculation of the engine coolant back to the engine.

9. The HVAC system of claim 1, further including a control valve in fluid communication with the engine coolant return conduit, the control valve configured to selectively direct the flow of the engine coolant from the supplemental heat exchanger to one of the cooling subsystem and the engine of the motor vehicle.

10. The HVAC system of claim 1, wherein the cooling subsystem is a chiller having an inlet in fluid communication with the refrigerant supply conduit and an outlet in fluid communication with the refrigerant return conduit.

11. The HVAC system of claim 10, wherein the refrigerant supply conduit and the refrigerant return conduit are in fluid communication with an air conditioning refrigeration system of the motor vehicle.

12. The HVAC system of claim 11, further including a refrigerant regulator valve in fluid communication with the refrigerant supply conduit, the refrigerant regulator valve configured to control the flow of the refrigerant from the air conditioning refrigeration system to the chiller.

13. The HVAC system of claim 1, wherein the supplemental heat exchanger has an inlet in fluid communication with a refrigerant supply conduit through which refrigerant from an air conditioning refrigeration system of the motor vehicle flows for the supplemental cooling of the passenger compartment.

14. The HVAC system of claim 1, further including a booster fan and a duct providing communication between the passenger compartment and the supplemental heat exchanger.

15. An HVAC system for a passenger compartment of a motor vehicle, comprising:
    a primary HVAC unit disposed within the passenger compartment of the motor vehicle and configured for at least one of heating and cooling a passenger compartment;
    a supplemental heat exchanger spaced apart from the primary HVAC unit and also disposed within the passenger compartment of the motor vehicle, the supplemental heat exchanger configured to supplement at least one of the heating and the cooling of the passenger compartment by the primary HVAC unit, wherein the supplemental heat exchanger is one of a positive temperature coefficient (PTC) heater and a thermal electric device (TED).

16. An HVAC system, comprising:
    a primary HVAC unit disposed within a passenger compartment of a motor vehicle and configured for at least one of heating and cooling a passenger compartment; and
    a supplemental heat exchanger spaced apart from the primary HVAC unit and also disposed within the passenger compartment of the motor vehicle, the supplemental heat exchanger configured to supplement at least one of the heating and the cooling of the passenger compartment by the primary HVAC unit,
    wherein the supplemental heat exchanger is positioned in one of an A-pillar and a B-pillar of the passenger compartment and has an inlet in fluid communication with a refrigerant supply conduit through which refrigerant from an air conditioning refrigeration system of the motor vehicle flows for the supplemental cooling of the passenger compartment.

\* \* \* \* \*